Patented Aug. 7, 1923.

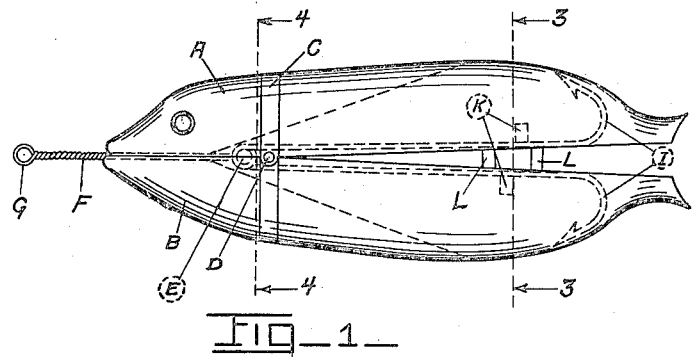
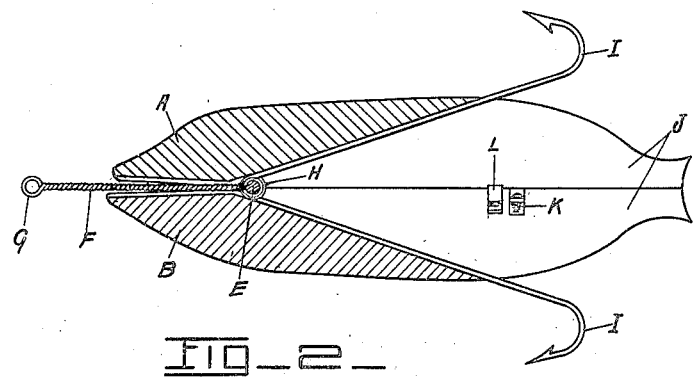
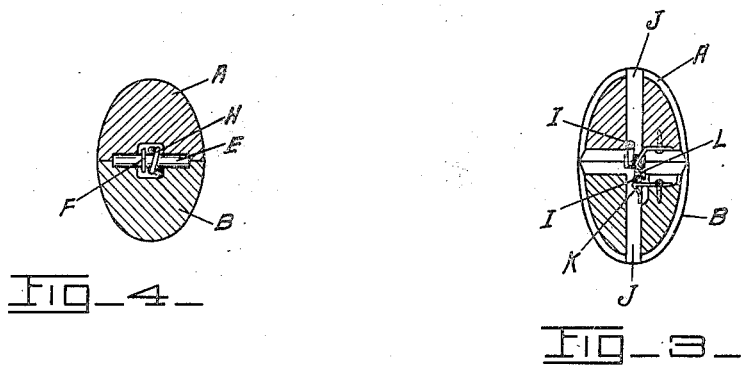

1,464,215

UNITED STATES PATENT OFFICE.

ALBERT OLSON, OF MINNEAPOLIS, MINNESOTA.

FISH LURE.

Application filed June 12, 1922. Serial No. 567,812.

*To all whom it may concern:*

Be it known that I, ALBERT OLSON, a subject of the King of Sweden, residing at Minneapolis, in the county of Hennepin and State of Minnesota, have invented certain new and useful Improvements in Fish Lures, of which the following is a specification.

This invention relates to artificial baits or lures for catching fish and the main object is to provide a simple, practical and weedless bait in which a pair of hooks are concealed until the bait is bitten by a fish, at which time the hooks will spring out for engagement with its mouth, so that the fish may be pulled in. Further objects will be disclosed in the course of the following specification and are illustrated in the accompanying drawing, in which:

Fig. 1 is an elevation of the lure, showing it as set.

Fig. 2 is a longitudinal section through the middle of the lure, showing it as sprung.

Fig. 3 is a cross section on the line 3—3 in Fig. 1.

Fig. 4 is a cross section on the line 4—4 in Fig. 1.

Referring more particularly to the drawing and by reference characters A and B designate the respective upper and lower halves or sections of the lure, which is formed to substantially resemble a small natural fish. A band C, jointed as at D, secures the section A and section B together, and the adjacent faces of said sections are so formed that a slight tilting movement of one section on the other, from the center D, is permitted.

A small transverse bar or pin E is clamped between the two sections A, B by resting in recesses in their adjacent faces. A leader F, having a loop G at its forward end, projects from the forward end of the lure, for attachment to the line (not shown), and its rear end is secured about the pin E. A wire spring loop H is also secured about the pin E, and this loop terminates in two rearwardly projecting hooks I which operate in vertical slots J in the sections A, B. The hooks I are normally spring held outwardly, but when set are held and concealed within the slots J by a pair of catches K, secured on the corresponding sections A, B. When thus set the rear ends of the sections are spread apart, as shown in Figs. 1 and 3. A pair of releasing members L are secured one on each section, and are so arranged that when the rear ends of said section are pinched together the said members will dislodge the hooks I from the catches K.

When the hooks are thus dislodged or sprung they will of course spring out and engage whatever has bitten over the lure. To again set the lure it is only necessary to hold the front end closed with one hand while the hooks are pressed into the slots J with the other hand, it being understood that the hooks also have a sidewise springing tendency toward their respective catches.

It is further understood that suitable modifications may be made in this device, provided, however, that such modifications come within the spirit and scope of the appended claims.

Having now therefore fully shown and described my invention what I claim to be new and desire to protect by Letters Patent is:

1. A lure comprising a pair of sections tiltably secured to each other, the front ends of the sections being normally closed when the lure is set, a pair of hooks concealed in said sections, and means for releasing said hooks when the rear ends of the sections are closed.

2. A lure comprising a pair of sections yieldingly separated at their rear ends, hooks concealed in the lure and normally spring held outwardly when released, means operative by closing the rear section ends together for releasing said hooks.

In testimony whereof I affix my signature.

ALBERT OLSON.